(12) United States Patent
Van Tulder

(10) Patent No.: US 11,257,384 B2
(45) Date of Patent: Feb. 22, 2022

(54) ADAPTIVE SCHEDULING OF FLIGHT TRAJECTORY COMMANDS FOR AUTONOMOUS OR REMOTELY CONTROLLED AIR SYSTEMS EXECUTING AIR TRAFFIC CONTROL FLIGHT CLEARANCES

(71) Applicant: The Boeing Company, Chicago, IL (US)

(72) Inventor: Paul A. Van Tulder, Burien, WA (US)

(73) Assignee: THE BOEING COMPANY, Chicago, IL (US)

( * ) Notice: Subject to any disclaimer, the term of this patent is extended or adjusted under 35 U.S.C. 154(b) by 208 days.

(21) Appl. No.: 16/716,730

(22) Filed: Dec. 17, 2019

(65) Prior Publication Data
US 2021/0183255 A1 Jun. 17, 2021

(51) Int. Cl.
*G08G 5/00* (2006.01)
*G05D 1/00* (2006.01)
*G05D 1/10* (2006.01)

(52) U.S. Cl.
CPC ........... *G08G 5/006* (2013.01); *G05D 1/0022* (2013.01); *G05D 1/1064* (2019.05); *G08G 5/0013* (2013.01); *G08G 5/0039* (2013.01); *G08G 5/0069* (2013.01)

(58) Field of Classification Search
CPC .... G08G 5/006; G08G 5/0069; G08G 5/0013; G08G 5/0039; G08G 5/0034; G08G 5/0026; G05D 1/0022; G05D 1/1064; G05D 1/0027
See application file for complete search history.

(56) References Cited

U.S. PATENT DOCUMENTS

| | | | |
|---|---|---|---|
| 8,633,835 B1 | 1/2014 | Spencer | |
| 8,781,650 B2 | 7/2014 | Downs | |
| 9,159,240 B2 | 10/2015 | Cornell et al. | |
| 10,102,753 B2 | 10/2018 | Bailey et al. | |
| 2007/0050098 A1* | 3/2007 | Caillaud | G08G 5/0056 701/3 |
| 2007/0150127 A1 | 6/2007 | Wilson, Jr. et al. | |
| 2012/0150426 A1 | 6/2012 | Conway | |
| 2013/0085661 A1* | 4/2013 | Chan | G08G 5/0082 701/122 |
| 2013/0179009 A1 | 7/2013 | Gershzohn | |
| 2016/0093217 A1* | 3/2016 | Hale | G08G 5/0021 701/120 |

* cited by examiner

*Primary Examiner* — James J Lee
*Assistant Examiner* — Shon G Foley
(74) *Attorney, Agent, or Firm* — MH2 Technology Law Group LLP

(57) ABSTRACT

A computer-implemented method, a computer system, and a non-transitory computer readable medium is disclosed for following air traffic control (ATC) flight trajectory profile instructions in the form of datalink commands to a flight management system (FMS) of a unmanned aircraft (UA) or a manned aircraft for ATC approved flight through controlled airspace along a mission of a vehicle of the UA or the manned aircraft.

20 Claims, 9 Drawing Sheets

ADAPTIVE SCHEDULING OF FLIGHT TRAJECTORY COMMANDS FOR AUTONOMOUS OR REMOTELY CONTROLLED AIR SYSTEMS EXECUTING AIR TRAFFIC CONTROL FLIGHT CLEARANCES

FIELD

The present disclosure relates to systems and methods for the scheduling of flight trajectory commands to flight system that adapts to changes in the vehicle dynamic flight path while reducing the remote operator workload associated with following the air traffic control (ATC) changing flight clearances typical of today's manned commercial traffic.

BACKGROUND

With the arrival of new vehicle types, airspace around the world will grow increasingly congested and legacy voice communication networks and radios used for ATC voice clearances will reach their performance limits; new vehicle types (i.e., unmanned or remotely operated vehicles) will not be accommodated by ATC over the legacy communication infrastructure. These new vehicle types however, could use digital means of communicating to exchange flight clearances. The needed digital communication technologies are become increasingly prevalent in personal messaging systems and through modern networks and radios (e.g., increased performance capabilities of satellite communications (SATCOM), cellular or other networks, etc.). This opens the door to remotely controlled, or autonomous vehicles (i.e., Unmanned Aircraft Systems (UAS) which include their Supervisory Station) and their gradual integration into the existing ATC navigation, surveillance infrastructure and ATC automation tools. Legacy vehicles, with datalink capabilities could benefit from reduced crew sets when using the modernized flight clearance exchange mechanisms such as enhanced datalink capabilities. In non-segregated airspace with shared public access to airspace resources such as airport runways, airspace centers and control sectors, management of congestion, safe and efficient air operations through digital means of communications is emerging and of paramount importance. Planning of air operations in shared airspace typically involves the use of ATC approved flight plans that route aircraft along ATC coordinated corridors free of terrain and conflicting traffic coordinating over existing voice communication channels. The addition of remotely or autonomously controlled new vehicle types (i.e., Unmanned Aircraft Systems (UAS) which include their Supervisory Station) in shared, moderately congested airspace (e.g., initially oceanic and remote ATC controlled airspace) and resulting increased traffic will likely need to be accommodated through the use of digital flight plan and communications of digital ATC clearances. The ATC approved flight plans may be broken down into a 4-dimensional (4D) trajectory of the aircraft parameters including latitude, longitude, altitude, speed and time that an aircraft follows for operational efficiency. Multiple aircraft (manned and unmanned) with varying equipment and capabilities share the same airspace. Based on the capabilities of the aircraft and onboard avionics such as the flight management system (FMS), the flight trajectories flown by the aircraft may vary significantly. It is cumbersome to monitor the aircraft with reference to only the active flight clearance while ATC voice clearances are dynamically changing. Future remote pilots will have to manage their workload particularly if the scarcity of skilled remote pilots must be mitigated by having them manage multiple vehicles simultaneously in the far term.

Accordingly, what is needed is automation of digital flight trajectory command uplinks to add scheduling as well as improved timing accuracy in computing and transmitting trajectory profiles. This will significantly address the above-noted deficiencies for the unmanned systems. This will also benefit existing vehicle types already using digital flight plans uplinked to the cockpit by air-ground communications for Air Traffic Services (e.g., vehicle trajectory commands or messages which may be Future Aircraft Navigation System (FANS 1/A) Controller Pilot Data Link Communications (CPDLC) messages or future messaging technologies), which enables a number of ATS that provide for the exchange of communication management and clearance/flight information/surveillance report messages that eventually will supersede voice communications employed in ATC procedures when and where appropriate. The legacy vehicle types rely on the human operator to review and execute uplinked commands in the cockpit and rely on the flight crew's situational awareness to manually select uplinked messages with little or no automation support and loose timing. The increased automation can also benefit the flight crews' workload for legacy, datalink equipped airplanes.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In accordance with examples of the present disclosure, a computer-implemented method for providing air traffic control flight trajectory profile instructions in the form of vehicle trajectory commands to a flight object of a unmanned aircraft or a manned aircraft for air traffic control approved active flight clearance through controlled airspace along a vehicle's mission is disclosed. The computer-implemented method comprises obtaining aircraft location, requested flight level, aircraft type and intended route constrained by trajectory change waypoints from an operator human-machine interface server of a flight object manager; determining, using the flight object manager, a trajectory profile, from route trajectory change waypoints using longitudinal, latitude, altitude constraints, speed constraints, wind speed, and wind direction input data displayed on the human-machine interface display for one or more remote pilots; obtaining from the human-machine interface display of a remote pilot in command of the one more remote pilots trajectory profile expected for the mission; determining, through a backward computation performed by a trajectory predictor engine of an entered trajectory profile data starting at a destination up to a current unmanned aircraft or manned aircraft location, a location at an expected trajectory change waypoints; determining a distance to go and time values from a current location to a next trajectory change waypoint and all following trajectory change waypoints in trajectory profile data; obtaining, continuously after brake release, real-time positions and speeds downlinked from an unmanned aircraft or manned aircraft flight management system (FMS) flight object; determining a time at which to uplink trajectory commands to the unmanned aircraft or manned aircraft and display times to the human-machine interface of a flight object of the one or more remote pilots; providing a corrected trajectory command transmission time for display to a flight object human-machine interface of the one or more remote pilots for up linking the corrected trajectory command; and providing the corrected trajectory command for radio transmission to the unmanned aircraft or the manned aircraft, including a transmission time correction factor, upon approval of the remote pilot in command.

In some examples, the computer-implemented method, further comprises determining an intended speed profile of trajectory predictor computations by reading performance data in aircraft performance models, geometric based or performance based methods. In some examples, the computer-implemented method further comprising storing the unmanned aircraft or manned aircraft trajectory profile expected for the mission in trajectory predictor trajectory profile data. In some examples, the computer-implemented method, further comprises determining a controller-pilot data link communications (CPDLC) commands that executes a trajectory change in the flight object of the unmanned aircraft or the manned aircraft. In some examples, the computer-implemented method, further comprises continuously computing an uplink time correction factor at a next trajectory change waypoint. In some examples, the air traffic control approved active flight clearance comprise an air traffic control approved connected path comprising a starting gate to an ending gate and all times and air traffic control constraints comprising speeds or altitudes at trajectory change waypoints in between during aircraft movement. In some examples, the vehicle trajectory commands are provided using Future Air Navigation System (FANS) CPDLC messages, or messages over future networks enabled for Internet Protocol Suite messages, or Control and Non-Payload Communications technologies.

In accordance with examples of the present disclosure, a computer system is disclosed. The computer system comprises a hardware processor; a non-transitory computer readable medium storing instructions that cause the hardware processor to perform a computer-implemented method for providing air traffic control flight trajectory profile instructions in form of vehicle trajectory commands to a flight object of a unmanned aircraft or a manned aircraft for air traffic control approved active flight clearance through controlled airspace along a vehicle's mission, the computer-implemented method comprising: obtaining aircraft location, requested flight level, aircraft type and intended route constrained by trajectory change waypoints from an operator human-machine interface server of a flight object manager; determining, using the flight object manager, a trajectory profile, from route trajectory change waypoints using longitudinal, latitude, altitude constraints, speed constraints, wind speed, and wind direction input data displayed on the human-machine interface display for one or more remote pilots; obtaining from the human-machine interface display of a remote pilot in command of the one more remote pilots trajectory profile expected for the mission; determining, through a backward computation performed by a trajectory predictor engine of an entered trajectory profile data starting at a destination up to a current unmanned aircraft or manned aircraft location, a location at an expected trajectory change waypoints; determining a distance to go and time values from a current location to a next trajectory change waypoint and all following trajectory change waypoints in trajectory profile data; obtaining, continuously after brake release, real-time positions and speeds downlinked from an unmanned aircraft or manned aircraft flight management system (FMS) flight object; determining a time at which to uplink trajectory commands to the unmanned aircraft or manned aircraft and display times to the human-machine interface of a flight object of the one or more remote pilots; providing a corrected trajectory command transmission time for display to a flight object human-machine interface of the one or more remote pilots for up linking the corrected trajectory command; and providing the corrected trajectory command for radio transmission to the unmanned aircraft or the manned aircraft, including a transmission time correction factor, upon approval of the remote pilot in command.

In some examples, the hardware processor is further configured to perform the method comprising determining an intended speed profile of trajectory predictor computations by reading performance data in aircraft performance models, geometric based or performance based methods. In some examples, the hardware processor is further configured to perform the method further comprising storing the unmanned aircraft or manned aircraft trajectory profile expected for the mission in trajectory predictor trajectory profile data. In some examples, the hardware processor is further configured to perform the method further comprising determining a controller-pilot data link communications (CPDLC) commands that executes a trajectory change in the flight object of the unmanned aircraft or the manned aircraft. In some examples, the hardware processor is further configured to perform the method further comprising continuously computing an uplink time correction factor at a next trajectory change waypoint. In some examples, the air traffic control approved active flight clearance comprise an air traffic control approved connected path comprising a starting gate to an ending gate and all times and air traffic control constraints comprising speeds or altitudes at trajectory change waypoints in between during aircraft movement. In some examples, the vehicle trajectory commands are provided using FANS CPDLC messages, or messages over future networks enabled for Internet Protocol Suite messages, or Control and Non-Payload Communications technologies.

According to examples of the present disclosure, a non-transitory computer readable medium is provided that is configured to store instructions that when executed by a hardware process perform a computer-implemented method for providing air traffic control flight trajectory profile instructions in the form of vehicle trajectory commands to a flight object of a unmanned aircraft or a manned aircraft for air traffic control approved flight clearance through controlled airspace along a vehicle's mission, the computer-implemented method comprising: obtaining aircraft location, requested flight level, aircraft type and intended route constrained by trajectory change waypoints from an operator human-machine interface server of a flight object manager; determining, using the flight object manager, a trajectory profile, from route trajectory change waypoints using longitudinal, latitude, altitude constraints, speed constraints, wind speed, and wind direction input data displayed on the human-machine interface display for one or more remote pilots; obtaining from the human-machine interface display of a remote pilot in command of the one more remote pilots trajectory profile expected for the mission; determining, through a backward computation performed by a trajectory predictor engine of an entered trajectory profile data starting at a destination up to a current unmanned aircraft or manned aircraft location, a location at an expected trajectory change waypoints; determining a distance to go and time values from a current location to a next trajectory change waypoint and all following trajectory change waypoints in trajectory profile data; obtaining, continuously after brake release, real-time positions and speeds downlinked from an unmanned aircraft or manned aircraft flight management system (FMS) flight object; determining a time at which to uplink trajectory commands to the unmanned aircraft or manned aircraft and display times to the human-machine interface of a flight object of the one or more remote pilots; providing a corrected trajectory command transmission time for display to a flight object human-machine interface of the one or more remote pilots for up linking the corrected trajectory command; and providing the corrected trajectory command for radio transmission to the unmanned aircraft or the manned aircraft, including a transmission time correction factor, upon approval of the remote pilot in command.

In some examples, in the non-transitory computer readable medium, the method further comprises determining an intended speed profile of trajectory predictor computations by reading performance data in aircraft performance models, geometric based or performance based methods. In some examples, in the non-transitory computer readable medium, the method further comprises storing the unmanned aircraft or manned aircraft trajectory profile expected for the mission in trajectory predictor trajectory profile data. In some examples, in the non-transitory computer readable medium, the method further comprises determining a controller-pilot data link communications (CPDLC) commands that executes a trajectory change in the flight object of the unmanned aircraft or the manned aircraft. In some examples, in the non-transitory computer readable medium, the method further comprises continuously computing an uplink time correction factor at a next trajectory change waypoint. In some examples, in the non-transitory computer readable medium, the air traffic control approved active flight clearance comprise an air traffic control approved connected path comprising a starting gate to an ending gate and all times and air traffic control constraints comprising speeds or altitudes at trajectory change waypoints in between during aircraft movement.

According to examples, the supervision station human-machine interface server and the supervision station trajectory commands scheduler server communicate with the UA or the manned aircraft FMS flight object using Future Air Navigation System (FANS) controller-pilot data link communications (CPDLC) commands, flight operations center (FOC) commands, automatic dependent surveillance contract (ADS-C) commands. FANS-1/a is a system for digital data communications between aircraft FMS systems and functions and ground services such as ATC or FOC similar to current personal messaging systems. FANS 1/A is designed for aviation applications to enable beneficial capabilities not possible with voice communications. The digital mechanisms for exchanging data with the FMS flight object will eventually supersede voice communications when and where appropriate. Large commercial airplanes (e.g., Boeing, Airbus, Bombardier, Embraer, etc.) use it in daily oceanic operations in a majority of ATC Flight Information Regions around the world to reduce airplane separations in oceanic, polar and remote airspaces, to reduce controller workload and to improve operational efficiency (i.e., fuel, time, safety and increased traffic density) for the airlines. FANS-1/A relies on a worldwide network of radio stations with global coverage.

According to examples, the supervision station operator receives data link transmission radios communicate down link messages to the supervision station trajectory prediction server using CPDLC, ADS-C surveillance messages, etc.; the supervision station data link commands scheduler server communicates uplink commands via the supervision station data link transmission radios to the UA or the manned aircraft using CPDLC messages for example.

According to examples, the ATC initial flight plan comprises authorization for the UA or the manned aircraft to proceed along the authorized route of flight specified by an active ATC authorities and filed with the ATC unit (e.g., departure airport) by widely available commercial tools such as ForeFlight (R) for iPad, available from ForeFlight LLC in Houston, Tex., prior to departure. The ATC clearance are the subsequent updates communicated over voice from the ATC controller managing the flight once the vehicle has started moving through ATC controlled airspace (e.g., airport surface area, airport tower or en route controller) or CPDLC departure digital messages for equipped manned airplanes (e.g., the Federal Aviation Administration Departure Clearance Datalink (DCL) implementation at well over 50 US airports in 2019).

According to examples, the ATC clearance comprises the route of the UA or the manned aircraft that comprises TCWs in two dimensions, an altitude of the UA or the manned aircraft and a clearance limit that describes the destination or the last authorized TCWs in the ATC cleared route of the UA or the manned aircraft. The ATC clearance limit, when not the destination airport, is incrementally updated by the successive ATC controllers as the vehicle traverses successive airspace sectors.

According to examples, the ATC flight plan comprises the initial ATC approved connected path comprising a starting gate to an ending gate and all times at TCW points in between during aircraft movement. The ATC clearance includes the initial flight plan and any ATC controller updates made since filing the flight plan. For manned airplanes, updates to the flight plan are entered by the flight crew through the FMS; for unmanned vehicles, this is done by the supervisory station operator or an automated process.

According to examples, the one or more supervision station trajectory time values are determined by the supervision station trajectory prediction server based on the most up to date ATC clearance to determine the current deviation of the aircraft trajectory based on weather data and a stream of system and navigation data from the UA or the manned aircraft.

According to examples, the current deviation is based on a comparison between a current location of the UA or the manned aircraft with the most up to date ATC clearance and ATC approved trajectory.

According to examples, the aircraft commanded along the ATC clearance is manned or unmanned.

BRIEF DESCRIPTION OF THE FIGURES

The accompanying drawings, which are incorporated in, and constitute a part of this specification, illustrate implementations of the present teachings and, together with the description, serve to explain the principles of the disclosure.

FIG. 1 is the departure to arrival airport end-to-end representation of the vertical trajectory profile.

FIG. 2 is the departure to arrival airport end-to-end representation of the horizontal trajectory profile in 2-D.

Figure 1:
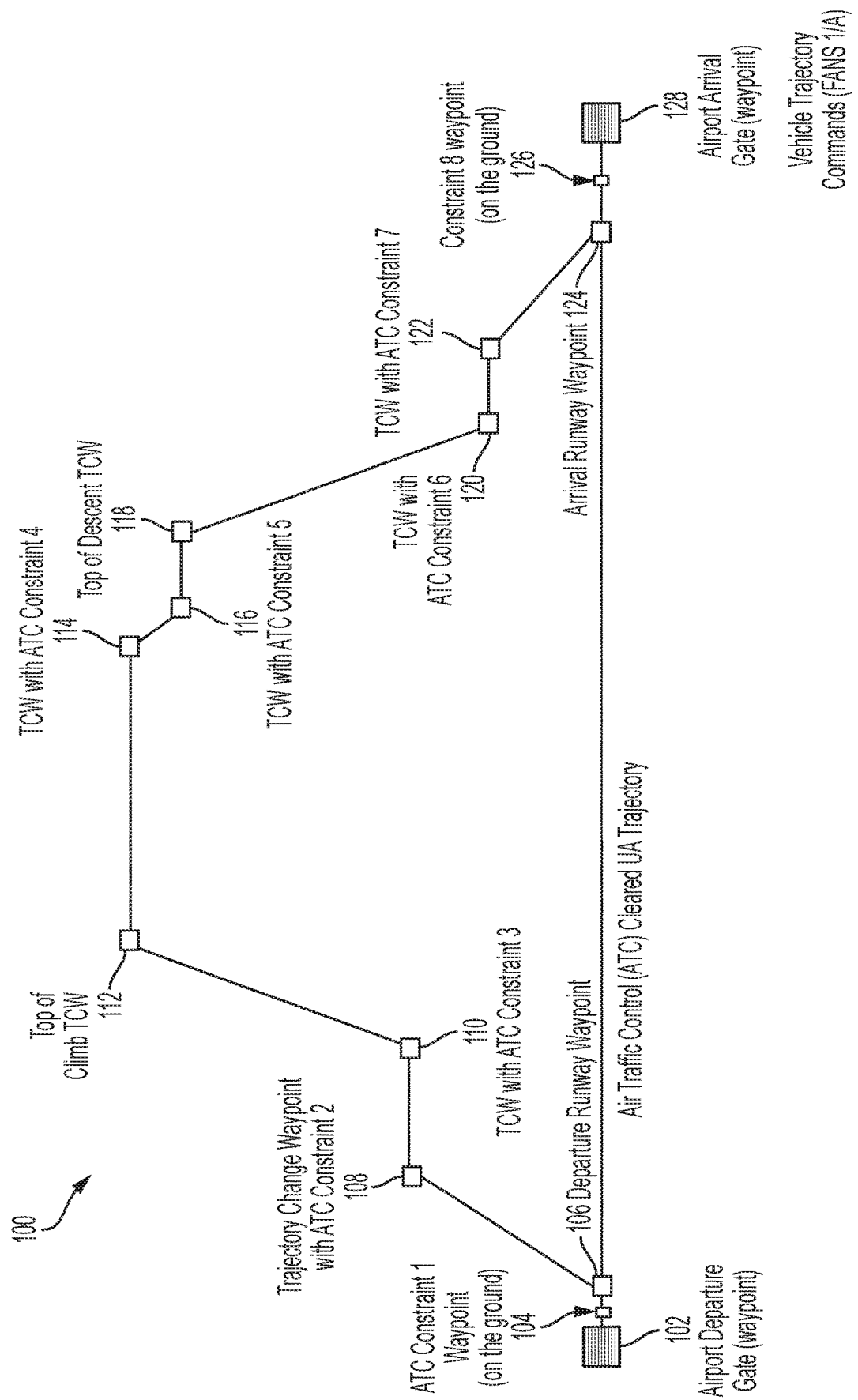
FIG. 1 shows an air traffic control (ATC) cleared UA trajectory (i.e., compliant to ATC constraints) according to examples of the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Wherever convenient, the same reference numbers will be used throughout the drawings to refer to the same or like parts.

An air traffic control (ATC) cleared trajectory, i.e., complaint to ATC constraints, is a trajectory that is authorized for an Unmanned Aircraft (UA) or manned aircraft to proceed along authorized route of flight specified by an active ATC unit. Three elements are used to compose an ATC cleared trajectory: 1) the route of flight (i.e., TCWs, in 2 dimensions), 2) a clearance limit (i.e., a waypoint along the route of flight to which the vehicle is authorized to proceed or the destination airport), 3) at least one TCW altitude (i.e., other altitude constraints are optional and depend on local airspace procedures and agreements). By authorizing the vehicle to fly along published routes (such as Jet Airways and Victor Airways, standard instrument departures, standard terminal arrival routes or instrument approaches) listed in the initial flight plan (i.e., the desired mission), the ATC unit ensures the airspace along the UA flight plan is cleared and the UA flight behaves likes current commercial traffic in today's National Airspace System (NAS). The UA vehicles are designed to use ATC clearances and should not induce extra workload on the part of today's ATC controllers managing traffic at public airports. Such an ATC issued cleared trajectory avoids of terrain obstructions, follows common traffic patterns into the airport compatible with other controlled traffic and avoids flight in proximity to airspace boundaries (e.g., military or other restricted operational areas) enabling orderly flow of traffic into busy airports while ATC maintains responsibility for vehicle-to-vehicle separation. The UA clearance uses 2-D TCWs and ATC constraints. The UA trajectory comprises a connected path gate to gate at all times during the flight to ensure it executes the mission with sufficient fuel and no unplanned maneuvers even when temporarily loosing communications means with the supervisory station. For a manned vehicle, a connected path may not be necessary in current implementations, discontinuities in the flight plan are solved manually by the crew on the vehicle and are coordinated using direct voice communications with ATC when they result in deviations from the ATC clearance.

According to examples of the present disclosure, the scheduling of flight trajectory commands provides automation for the timely and accurate uplink transmission of interoperable flight commands to the vehicle systems from a supervision station requiring minimal operator workload. The issuance of trajectory commands responds to dynamic ATC clearances changing to accommodate fluctuations in traffic patterns to public airports and re-sequencing with other aircraft assigned by ATC to the same runway. The dynamic ATC clearances for use in ATC controlled airspace will induce UA vehicles behaviors similar to current commercial traffic patterns already in use at these airports. The ATC clearances may require last minute trajectory changes to best align the vehicle with other traffic similar to clearances issued for today's commercial traffic. These ATC clearances can be used to integrate UA traffic in the National Airspace System (NAS) infrastructure and allow ATC to maintain continuous pressure and traffic flow to the runway regardless of vehicle type (i.e., manned or unmanned).

FIG. 1 shows an air traffic control (ATC) cleared UA trajectory 100 (i.e., compliant to ATC constraints) according to examples of the present disclosure. The ATC cleared UA trajectory 100 comprise aerodrome departure gate (waypoint) 102, ATC constraint 1 waypoint (on the ground) 104, departure runway waypoint 106, trajectory change waypoint with ATC constraint 2 108, TCW with ATC constraint 3 110, top of climb TCW 112, TCW with ATC constraint 4 114, TCW with ATC constraint 5 116, top of descent TCW 118, TCW with ATC constraint 6 120, TCW with ATC constraint 7 122, arrival runway waypoint 124, constraint 8 waypoint (on the ground) 126, and aerodrome arrival gate (waypoint) 128.

Figure 2:
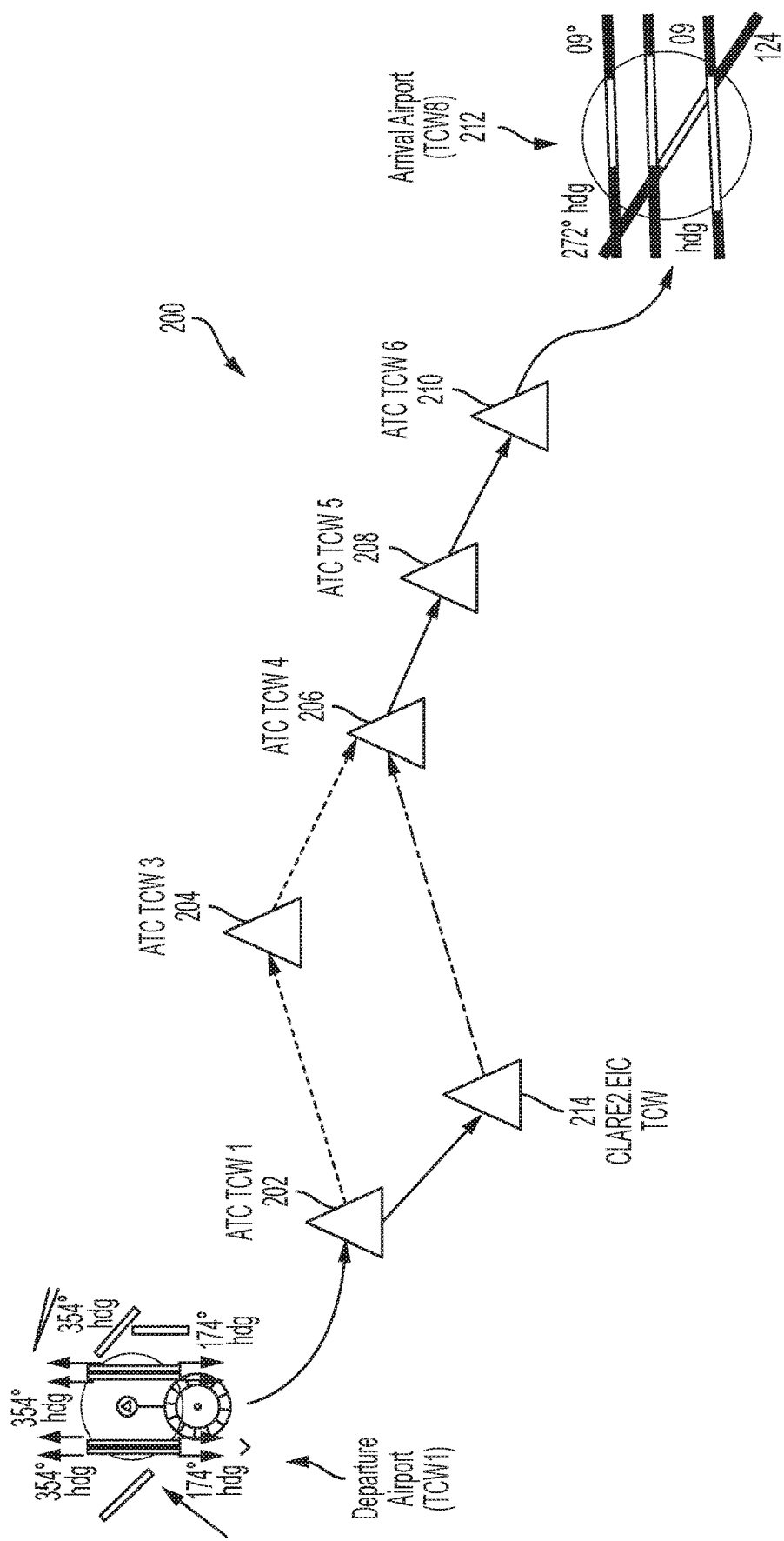
FIG. 2 shows the UA trajectory horizontal trajectory together with the 2D location relative to their ground location of the present disclosure, according to examples of the present disclosure.

FIG. 2 shows a departure route 200 according to examples of the present disclosure. As shown in FIG. 2 an aircraft departs from departure gate (ATC TCW1 element 104) 202 and arrives at arrival gate (TCW8 element 126) 212 along a flight plan segmented into a plurality of TCWs. The original flight plan includes a segment beginning at ATC TCW1 202 and continuing to ATC TCW3 204, ATC TCW4 206, ATC TCW5 208, ATC TCW6 210, and ending at TCW8 212. When the supervision station operator detects discontinuities in the flight clearance, it may have to revise and includes geodetic TCWs such as: ATC TCW1 202, CLARE2.EIC TCW 214, ATC TCW4 206, ATC TCW5 208, ATC TCW6

210, and ATC TCW8 212. Departure clearance including "Then as Filed", UMXXX: CLEARED TO KMIA AIRPORT, CLARE2.EIC THEN AS FILED.

Figure 3:
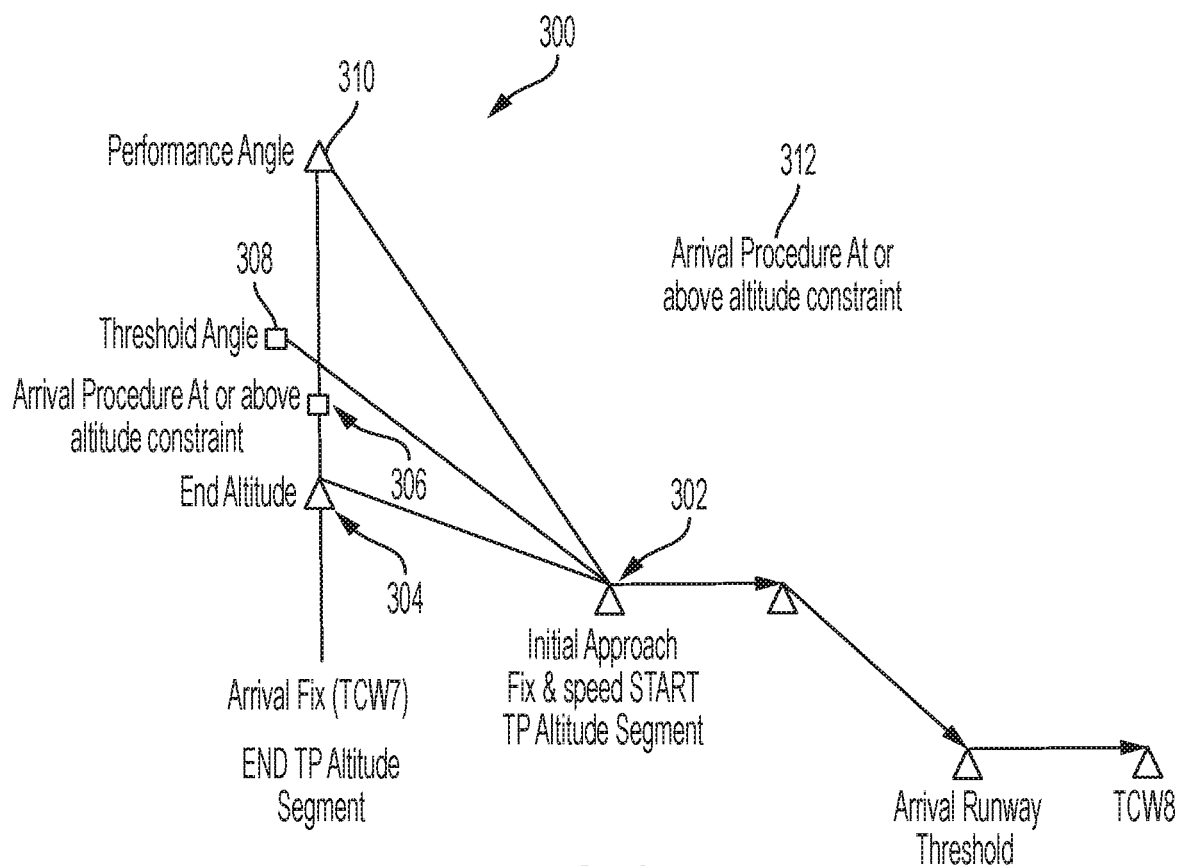
FIG. 3 shows a typical arrival segment of the vertical trajectory profile according to examples of the present trajectory profile. The trajectory computations are performed in the reverse of the direction of flight starting from the arrival airport, according to examples of the present disclosure.

FIG. 3 shows a descent clearance with an altitude step at the initial approach fix (e.g., TCW TOD) 300, according to examples of the present disclosure. As shown in FIG. 3, airplane position A 302, current altitude segment 304, airplane position B 306 are shown relative to a new altitude segment 308. The basic mechanism to plan the route is to determine the location and altitude of the arrival airport in relations to the UA trajectory. The trajectory predictor projects the path backward to the last altitude constraint as published in typical arrival procedures using standard descent angles and determines the start of descent after the level segment.

Backward computation of the UA trajectory for altitude changes, discussed in relation to FIG. 3, starts from the arrival airport, according to examples of the present disclosure. Segment descent prediction is an illustrative example of one implementation of a number of integrated segment trajectory predictor engine 826 in FIG. 8. Segment prediction depicts a predicted segment, illustrated by start altitude segment 302 and end altitude segment 304. An ATC altitude constraint (e.g., arrival procedure ATC TCW7) is above the predicted segment in this illustrative example. In a situation where the ATC altitude constraint is higher than an expected altitude at the TCW location, the trajectory predictor (TP) will apply threshold angle above the predicted descent segment, assuming an unconstrained aircraft performance angle 310. This allows the TP to recognize the situation where the ATC constraint is allowed to fly above the constraint (at or above) and disregard the constraint as hard and fast limit. An unconstrained vehicle performance angle is the angle the vehicle would select to fly based on its own performance characteristics rather than those imposed by ATC altitude restrictions. Typically, air traffic control may force an aircraft down earlier due to constraints, such as crossing traffic. However, in this illustrative example, the vehicle itself, if it were alone in the airspace, may select to descend later to achieve the most beneficial performance angle for the vehicle. The TP is configured to adjust the predicted segment by calculating level flight for the vehicle from the arrival fix position until performance angle 310 is intercepted. If the ATC constraint continues to be above the predicted segment after the adjustments, as depicted by performance angle 310 and arrival procedure position 312, the TP will calculate another continuous descent at the constrained altitude. A similar approach may be taken when the ATC constraint is below the predicted segment and close to a shallow unconstrained performance angle.

Figure 4:
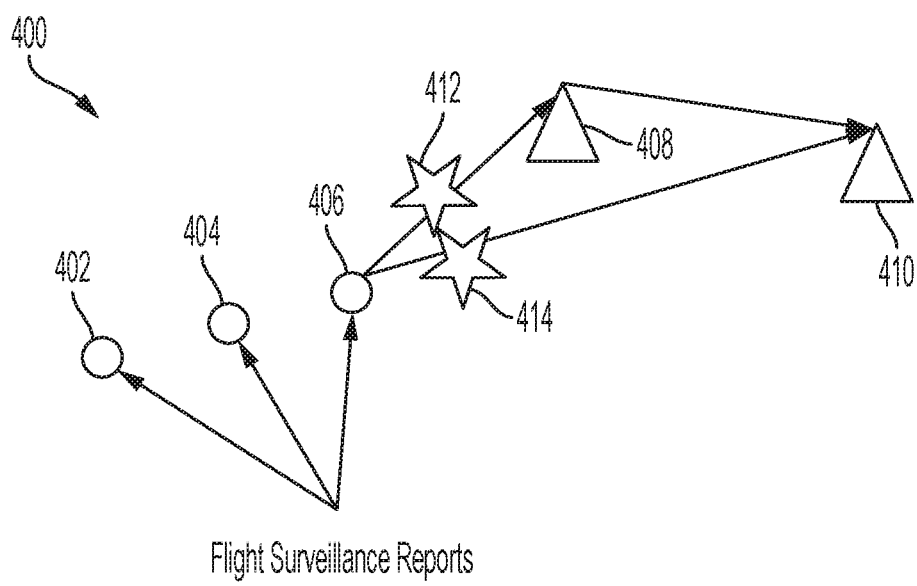
FIG. 4 shows the trajectory computation of a direct routing implementation depicted in accordance with an example of the present disclosure. Direct routing implementation 400 may be performed by trajectory predictor engine 826 in FIG. 8. When ATC constraint waypoint and/or flight plan information indicates that the vehicle is heading to a waypoint which is not in the navigation database and can't be connected, the ground station operator needs to enter a geodetic referenced waypoint along the same heading, triggering updates to the lateral calculations.

FIG. 4 shows a rerouted implementation 400 between TCW 2-3 to Top Of Climb (TOC)-4, according to examples of the present disclosure. As shown in FIG. 4, flight surveillance reports may include a first flight surveillance report 402, a second flight surveillance report 404, a third flight surveillance report 406 are used to estimate the surveillance error prior to TCW2 408 or TCW3 410 provided at first location 412 and/or second location 414. Using uplink command time with correction factor at first location 412 and/or second location 414 is an example of applying the correction factor to enable more accurate and timely commands (i.e., before passing TCW2 408) for the change in trajectory.

Figure 5:
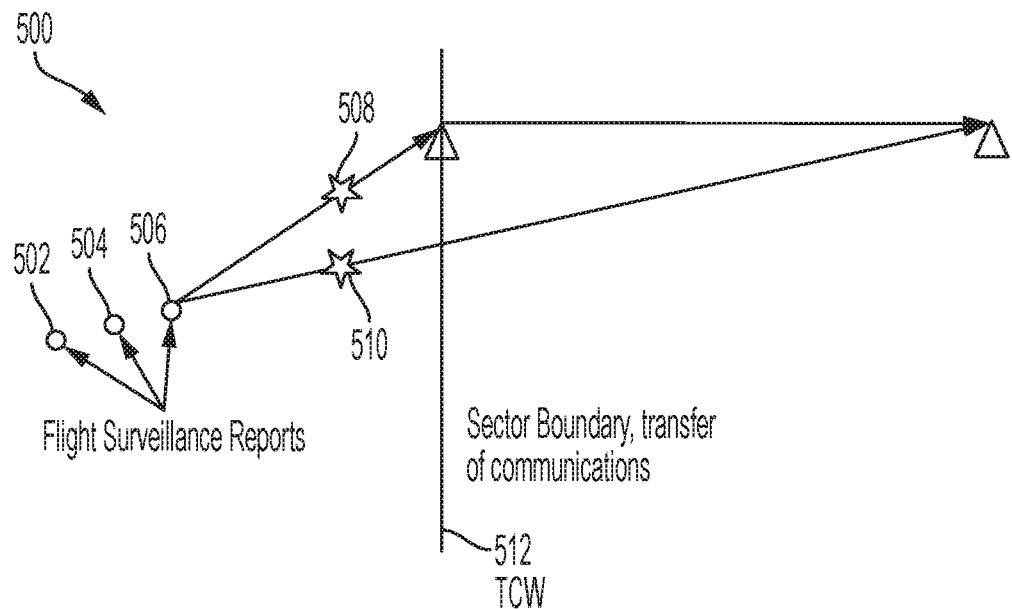
FIG. 5 shows the trajectory computation when traversing an ATC airspace boundary such as a sector or a center boundary requiring transfer of communications and a new clearance limit.

FIG. 5 shows a transfer of ATC sector and transfer of communications (e.g., TCW at airspace boundary) 500, according to examples of the present disclosure. As shown in FIG. 5, flight surveillance reports may include a first flight surveillance report 502, a second flight surveillance report 504, a third flight surveillance report 506 are used to estimate the surveillance error prior to the transfer communications for an airplane at a plurality of locations dependent on the state of the airplane such as first location 508 or second location 510. Using uplink command time with correction factor at first location 508 and/or second location 510 as the airplane nears TCW boundary 512 (e.g. a sector boundary) is another example of applying the correction factor to enable accurate and timely command uplinks for the transfer of ATC communications.

Figure 6:
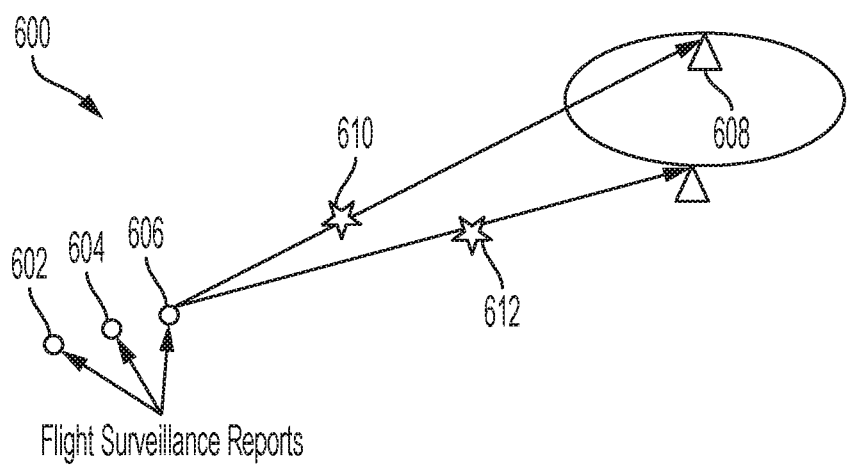
FIG. 6 shows the trajectory computation to enter a holding maneuver at a trajectory change waypoint.

FIG. 6 shows a holding clearance 600 (e.g., TCW6), according to examples of the present disclosure. As shown in FIG. 6, flight surveillance reports may include a first flight surveillance report 602, a second flight surveillance report 604, a third flight surveillance report 606 are used to estimate the surveillance error prior to entering the holding maneuver defined by ATC. The hold clearance defined by hold pattern 608 can be entered at several locations such as a first location 610 or second location 612. Using uplink command time with correction factor at first location 610 and/or second location 612 as the airplane nears the holding clearance 600 is another example of applying the correction factor to enable accurate and timely command uplinks to execute the hold maneuver.

Figure 7:
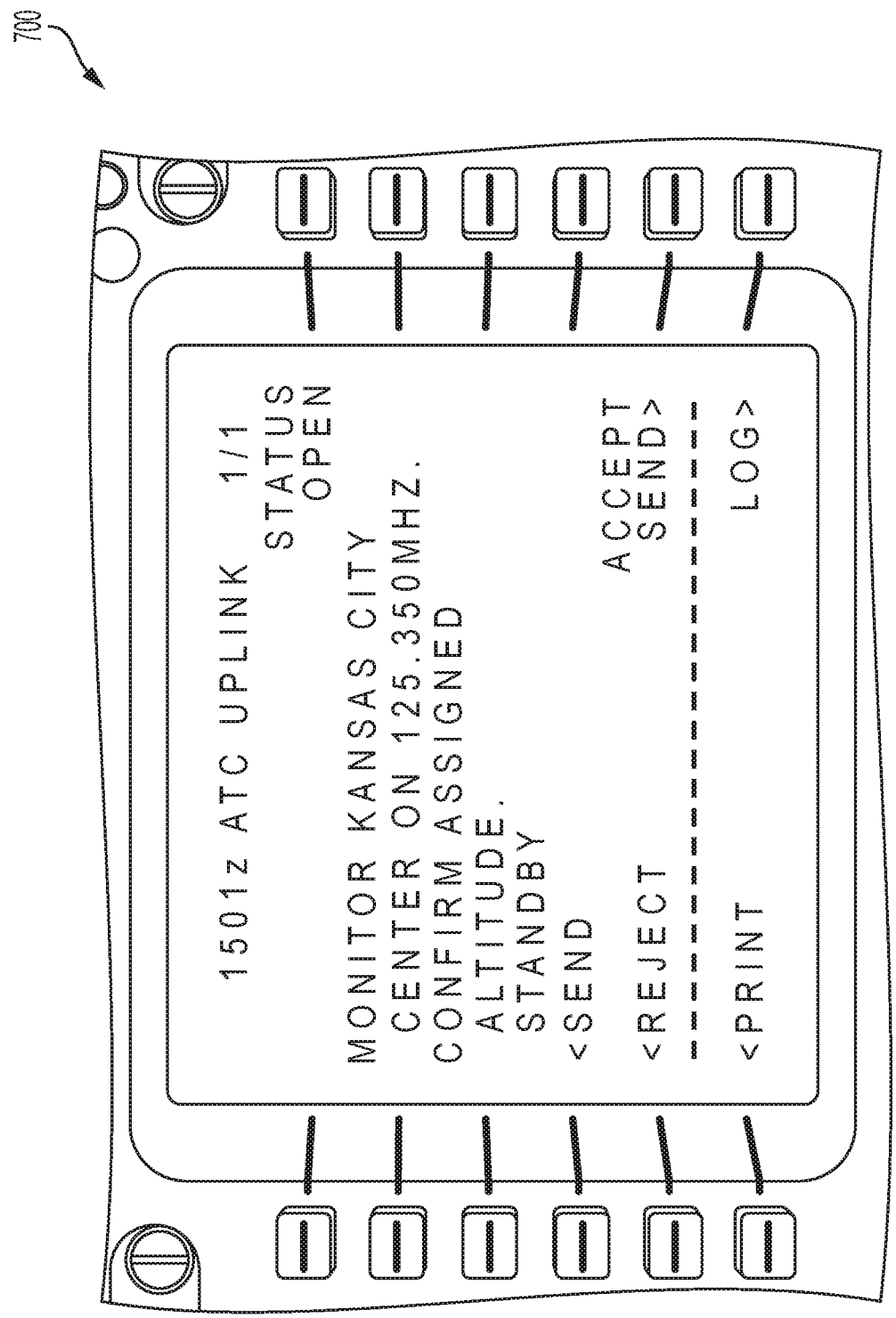
FIG. 7 shows the change of sector or center and transfer of communications in current manned systems implementations.

FIG. 7 shows a computer interface 700 that is used to transfer to new ATC sector, UM120: MONITOR KANSAS CITY CENTER ON 125.350 MHZ, CONFIRM ASSIGNED ALTITUDE. UM120 is an example of the current FANS 1/A implementation of transfer of communications uplinks in the cockpit of manned airplanes.

Figure 8:
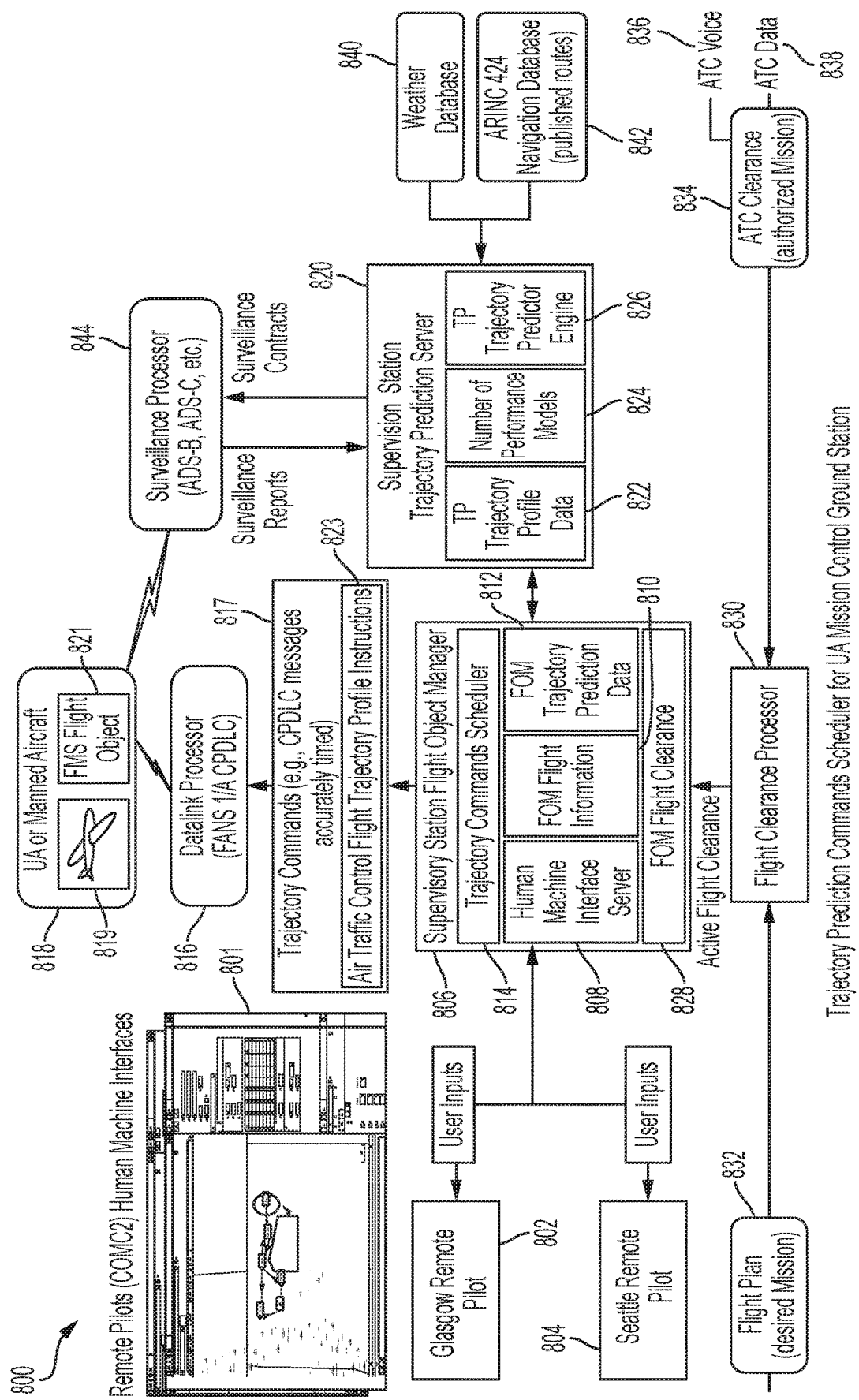
FIG. 8 shows a trajectory prediction commands scheduler system for UA mission control supervision station, according to examples of the present disclosure.

FIG. 8 shows a trajectory prediction commands scheduler system for UA mission control supervision station 800, according to examples of the present disclosure. First remote pilot 802, i.e., Glasgow remote pilot, or second remote pilot 804, i.e., Seattle remote pilot, provides and/or receives user inputs to the flight object manager 806, which comprises a human-machine interface (HMI) server (COMC2) 808, flight object manager (FOM) flight information 810, FOM flight clearance 828, and FOM trajectory prediction data 812, information from which are displayed on human-machine interface 801. FOM flight clearance 828 receives and stores active flight clearance from flight clearance processor 830. The Boeing Common Open Mission Management Command and Control (COMC2) software suite enables a single operator (i.e., the remote pilot in command) to control multiple, disparate UA with improved timing accuracy of uplinked commands that reduce his workload and training needs. Its open systems architecture interfaces directly to air vehicles, communication links and displays as well as provides mission data and system status in compliance with US and European military engineering standards. The COMC2 architecture enables new applications to be rapidly added or modified without requiring the entire system to be rebuilt; it only requires tailored vehicle specific displays and vehicle specific software modules. Such displays can include Primary Flight Display (PFD), Navigation Display (ND), symbols (TOC, TOD, estimated time of arrival (ETA), requested time of arrival (RTA), etc. already available on manned aircraft.

Trajectory command data for display (i.e., FANS CPDLC commands, Airline/Flight Operational Control (AOC), ADS-C, etc. messages) is provided from the Supervision Station flight object manager 806 to trajectory commands scheduler server 814 (e.g. a next trajectory change waypoint). Trajectory commands scheduler server 814 provides transmission time correction factor for in the form of air traffic control flight trajectory profile instructions 823, such as vehicle trajectory command (i.e., CPDLC) 817, which can be a next trajectory command to one or more datalink command processor (FANS 1/A, Internet Protocol Suite (IPS), Control and Non-Payload Communications (CNPC)) 816, which are then relayed to UA or the manned aircraft 818. UA or manned aircraft 818 comprises vehicle dynamics 819 and FMS flight object 821. CPDLC uses a datalink between ATC clearance delivery and a Data Communication Management Function unit (DCMF) unit in the aircraft. For manned vehicles, the screens displays the elements of the standard clearance and the pilot reads the clearance and, if it is correct, presses an "Accept" function on the display. Once this is done, the flight plan is activated. For unmanned vehicles, the DCMF functionality will be automated.

Trajectory commands scheduler server 814 also communicates with supervision station trajectory prediction server 820. For example, trajectory prediction server 820 can be operated as the Trajectory Prediction (TP) of as disclosed in U.S. Pat. No. 8,818,576 titled "Tailored arrivals allocation system trajectory predictor" issued on Aug. 26, 2014, which is commonly owned with the present application. Trajectory prediction server 820 comprises trajectory profile data 822, number of performance models 824, and trajectory predictor engine 826 using a point mass model for its kinematic systems of equations. Trajectory prediction server 820 produces a four-dimensional trajectory predictions, or four-dimensional trajectory solutions, by analyzing a number of factors including, without limitation, aircraft and airline preference information, applicable route and airspace constraints, environmental information, accurate timing of uplink commands, and aircraft intent when triggered by recognized embodiments, such as a flight object manager. Flight object manager is technique used in arrival systems, which retrieves information from a number of flight plans, a number of flight schedules, and flight status information, and consolidates the information retrieved to form flight information. In an arrival system, such as the tailored arrivals allocation system, trajectory prediction server 820 processes preferred aircraft routing and desired times at waypoints to produce a four-dimensional trajectory prediction. A four-dimensional trajectory prediction is a trajectory prediction that provides information in the four dimensions of latitude, longitude, altitude, and time. Trajectory prediction server 820 applies flight path profile data (e.g., derived flight path angle data) as well as applicable airspace constraints, such as airspace information, configuration data, weather information (i.e., winds at waypoints, etc.) and time over waypoints, to a selected construction technique in order to generate a four-dimensional trajectory prediction. The HMI server configuration data may contain details on which of a number of construction techniques the TP should follow, or select, for cases when the required information for trajectory construction is not available or when the aircraft behavior differs from the profile predictions. In an illustrative example, a selected construction technique may be a technique that satisfies local operational procedures and/or aircraft operator preferences. There may be cases when the TP may combine a number of different construction techniques to obtain a higher level of prediction accuracy at TCWs or to the destination aerodrome. Each trajectory prediction generated by trajectory prediction server 820 is tailored for an individual aircraft's needs and is sufficiently accurate to allow uninterrupted predictions of flight profiles from the current position of an aircraft to the runway threshold, which may be used in determining arrival route clearances into the destination aerodrome.

Supervision Station Trajectory prediction server 820 communicates with and receives ownship fight plan and trajectory clearance data from flight clearance processor 830 over a one way communication channel, which provides data on the entire flight from applications such as ForeFlight for iPads or subscriptions from services providers such as Jeppesen or Garmin. Flight clearance processor 830 is based on flight plan (desired mission) data 832 and ATC clearance data (authorized mission) 834. Data from ATC clearance data 834 is provided by ATC voice 836 and ATC data 838. The flight plan, which can be defined by one or more waypoints to perform a desired mission, is authorized to by an ATC Air Navigation Services Provider for the airspace being traversed (e.g., FAA in the US, Nav Canada in Canada, etc.), which provides an ATC cleared trajectory (authorized mission) to a UA mission control supervision station. The supervision station, by transmitting vehicle trajectory commands (FANS 1/A) to the UA or the manned aircraft, guides the vehicle on its mission.

Supervision station trajectory prediction server 820 also communicates with a weather database 840 that provides weather data and navigation database 842, such as Aeronautical Radio, Incorporated (ARINC) 424 standard, an International Navigation System Data Base Standard, that provides data on published routes over a one way communication channel. The ARINC 424 standard is available from Collins Aerospace in West Palm Beach, Fla., USA and other suppliers.

Supervision station trajectory prediction server 820 also communicates with and receives ownship real-time surveillance data (radar, ADS-B, ADS-C, etc.) from surveillance processor 844 that provides a time to next trajectory profile constraint from vehicle state data over a one-way communication channel.

Supervision station trajectory prediction server 820 determines a first time to send a first aircraft (AC) data instruction to the UA or the manned aircraft prior to the UA or the manned aircraft reaching a first way point from the plurality of waypoints based on a prediction algorithm and one or more of the following: the weather, the stream of system and navigation data, and the flight data from other manned aircraft, unmanned aircraft, or both. Supervision station trajectory prediction server 820 analyzes the active flight clearance to determine a first deviation of the active flight clearance based on one or more of the following: the weather data, the stream of system and navigation data, and the flight data from other manned aircraft, unmanned aircraft, or both. Supervision station trajectory prediction server 820 also analyzes the active flight clearance to determine subsequent deviations based on one or more of the following: the weather data, the stream of system and navigation data, and the flight data from other manned aircraft, unmanned aircraft, or both. Supervision station trajectory prediction server 820 also determines a second time to send the first AC data instruction to the UA or the manned aircraft prior to the UA or the manned aircraft reaching a first way point from the plurality of waypoints based on the first deviation of the active flight clearance and the prediction algorithm and one or more of the following: the weather, the stream of system and navigation data, and the flight data from other manned aircraft, unmanned aircraft, or both and provides the first AC data instruction to the remote pilots to relay the first trajectory commands to the UA or the manned aircraft. In some examples, the Supervision station trajectory prediction server 820 performs the analysis by comparing a current location of the UA or the manned aircraft with a planned location based on the flight plan or latest ATC clearance updates (i.e., active flight clearance).

The Supervision station trajectory prediction server 820 further repeats the obtaining the weather data and the obtaining the stream of system and navigation data; determining, by the prediction server, a subsequent times to send subsequent data instructions to the UA or the manned aircraft prior to the UA or the manned aircraft reaching additional way points from the plurality of waypoints based on the prediction algorithm and the one or more of the following: the weather, the stream of system and navigation data, and the flight data from other manned aircraft, unmanned aircraft, or both. The supervision station trajectory prediction server 820 provides the subsequent AC data instructions to the remote pilots to relay the subsequent trajectory commands to the UA or the manned aircraft.

Supervision station trajectory prediction server 820 also communicates with and receives data from trajectory commands scheduler server 814. Trajectory commands scheduler server 814 communicates with and provides a transmission time correction factor for a next trajectory change points as illustrated in FIGS. 3 through 7. Commands are sent over, for example, a CPDLC interface, to one or more datalink transmission radios controlled by datalink command processor 816 using FANS 1/A, which are then communicated to the UA or manned aircraft 818.

Figure 9A:
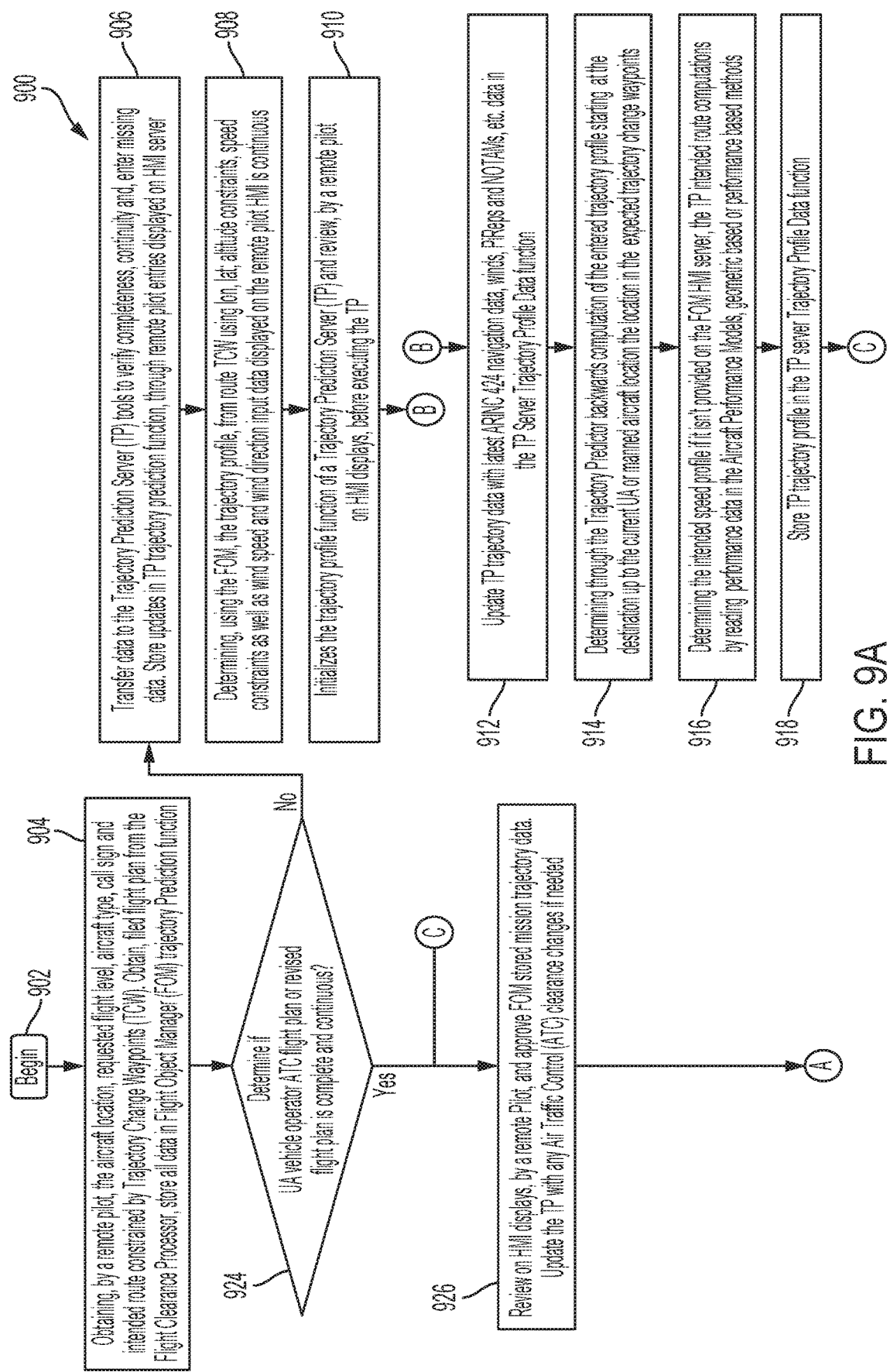
FIGS. 9A-9B show a computer-implemented method for providing ATC flight trajectory profile instructions to an unmanned aircraft (UA) or a manned aircraft for approved movement coordinated by the ATC flight plan through an airspace along a trajectory according to examples of the present disclosure.
Figure 9B:
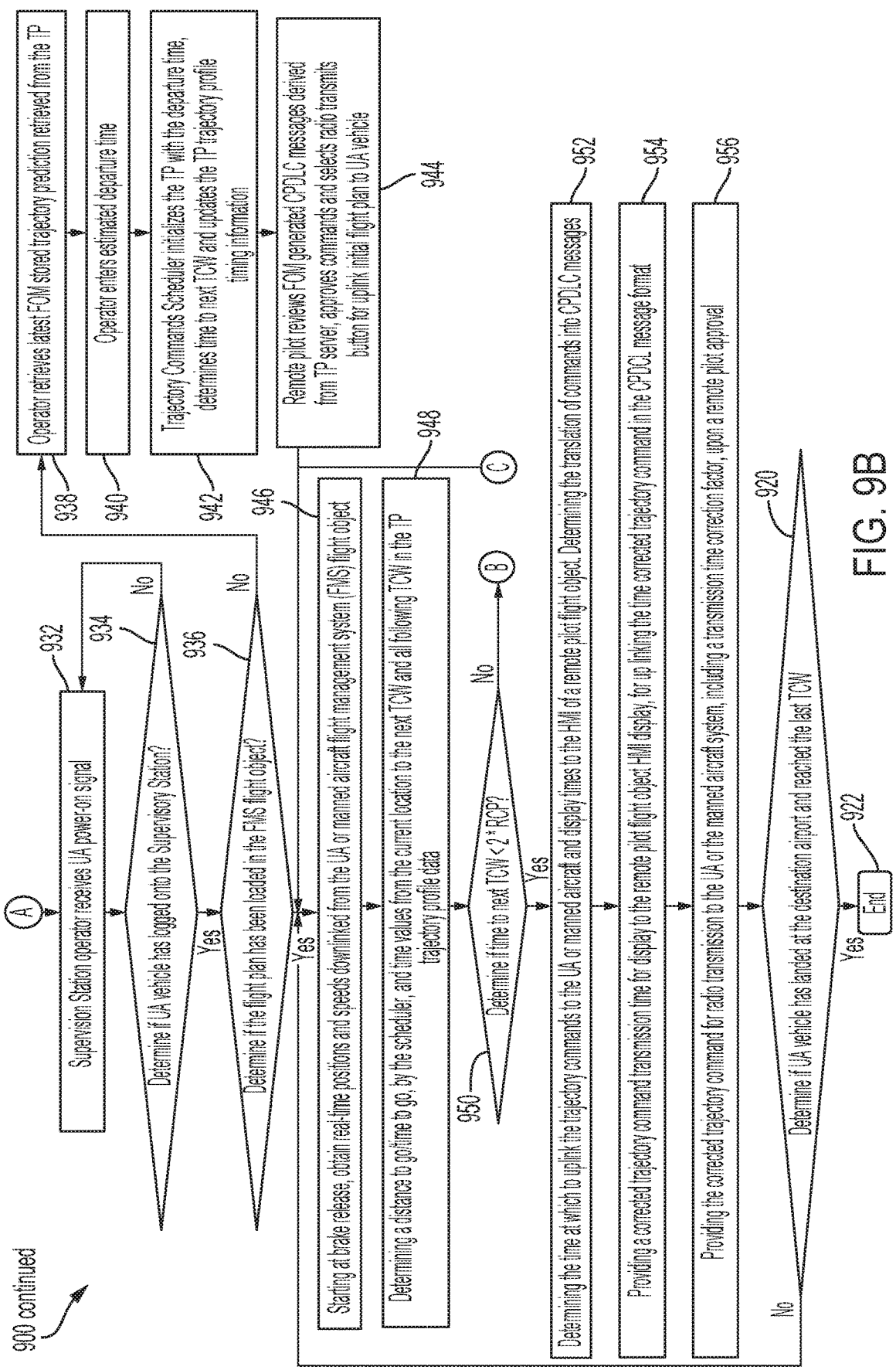

FIGS. 9A-9B shows a computer-implemented method 900 for providing air traffic control (ATC) flight trajectory profile instructions in the form of commands to an unmanned aircraft (UA) or a manned aircraft for approved movement coordinated by the ATC cleared trajectory flying through airspace along the vehicle's mission, according to examples of the present disclosure. The computer-implemented method 900 begins at 902. The computer-implemented method 900 continues by obtaining by a remote pilot, at 904, aircraft location, requested flight level, aircraft type, and intended route constrained by TCWs from an operator human-machine interface (HMI) function of a flight object manager (FOM). Returning to FIG. 8, first remote pilot 802 and/or second remote pilot 804, for example, obtains aircraft location, requested flight level, aircraft type, and intended route constrained by TCWs using HMI server 808 and stores the profile data in the FOM trajectory prediction data 812. In another example, obtains the information from Flight Clearance Processor's flight plan 832 and/or ATC data 838 using HMI server 808, stored in FOM trajectory prediction data 812.

The computer-implemented method 900 continues by determining, at 924, if UA vehicle operator flight plan, ATC filed or revised clearance is complete and continuous (i.e., enables a continuous flight path). If the results of the determination at 924 is negative (No), then the computer-implemented method 900 continues by obtaining missing data, at 906. The transfer of FOM data to the Trajectory Prediction Server, at 906, through a remote pilot entries displayed on HMI server 808, allows the Trajectory Prediction Server to compute the UA or manned aircraft continuous trajectory profile expected for the mission. Returning to FIG. 8, first remote pilot 802 and/or second remote pilot 804, for example, enters the missing data and stores it in Flight Object Manager (FOM) trajectory prediction function 812 through remote pilot entries displayed on HMI server 808. The TP server obtains data from FOM 812 to execute the TP aircraft predicted trajectory engine 826, store the resulting profile in trajectory profile data 822 using HMI server 808.

The computer-implemented method 900 continues by determining using the TP engine, at 908, the trajectory profile from route TCW using one or more of the following: longitude, latitude, altitude constraints, speed constrains, wind speed, and wind direction input data displayed on the remote pilot HMI. Returning to FIG. 8, the trajectory predictor engine 826 determines the trajectory profile using data from one or more of the FOM trajectory prediction data 812 and verifies that the path is continuous.

The computer-implemented method 900 continues by initializing, at 910, the trajectory profile function of a Trajectory Prediction Server (TP) with the latest environmental data and flight plan data. Returning to FIG. 8, the trajectory predictor engine 826 is initialized based on data from flight clearance processor 830, data from weather database 840, and data from ARINC 424 navigation database 842.

The computer-implemented method 900 on a continuing basis updates, at 912, the TP trajectory data with latest ATC Clearance data 834, as well as changes to winds, pilot report (PiReps), notice to airman (NOTAMs), etc. data and updates the results in the TP Server Trajectory Profile Data 822. Returning to FIG. 8, the trajectory predictor engine 826 is updated based on data from flight clearance processor 830, data from weather database 840, and data from ARINC 424 navigation database 842.

The computer-implemented method 900 continues by determining through the trajectory predictor, at 914, backwards computation of the entered trajectory profile starting at the destination up to the current UA or manned aircraft location the location in the expected trajectory change waypoints. Returning to FIG. 8, the trajectory predictor engine 826 is configured to perform a backwards computation using data from trajectory profile data 822 starting, for example, at TCW (ending gate) 128 of FIG. 1 and continuing to TCWS 126, 124, 122, . . . , 112, 110, 108, and 106.

The computer-implemented method 900 continues by determining, at 916, the intended speed profile if it is not provided on the FOM HMI server, the TP intended route computations by reading performance data in the Aircraft Performance Models, geometric-based or performance-based methods. Returning to FIG. 8, the trajectory predictor engine 826 is configured to determine the intended speed based on data from trajectory profile data 822 and/or data from the number of performance models 824.

The computer-implemented method 900 continues by storing, at 918, TP trajectory profile in the supervision station trajectory prediction server Trajectory Profile Data function. Returning to FIG. 8, the trajectory profile is stored in trajectory profile data 822.

If the results of the determination at 924 is positive (Yes), then the computer-implemented method 900 proceeds to reviewing on HMI displays by a remote pilot, at 926, and approve FOM stored mission trajectory data. The TP data is updated for any ATC clearance changes if needed. Returning to FIG. 8, first pilot 802 and/or second pilot 804 reviews ATC clearance data 834 on HMI server 808.

The computer-implemented method 900 continues by receiving by the Supervision Station operator, at 932, UA power-on signal. Returning to FIG. 8, first pilot 802 and/or second pilot 804 takes notice of the "power on" indication on the HMI server display and the FOM being in the "power-on" state.

The computer-implemented method 900 continues by determining, at 934, if UA vehicle has logged onto the Supervisory Station. If the results of the determination at 934 is negative (No), then the computer-implemented method 900 returns to 932. If the results of the determination at 934 is positive (Yes), then the computer-implemented method 900 proceeds, at 936, to determine if the active flight clearance has been loaded in the vehicle FMS flight object. Returning to FIG. 8, first pilot 802 and/or second pilot 804 takes notice of the "vehicle logged-on" indication on the HMI server display and the FOM being in the "log-on" state.

If the results of the determination at 936 is negative (No), then the computer-implemented method 900 proceeds by retrieving, at 938, latest FOM stored trajectory prediction retrieved from the TP by the operator. Returning to FIG. 8, first pilot 802 and/or second pilot 804 retrieves the TP trajectory data from the FOM trajectory prediction data 812 and enters the data in the trajectory command scheduler server 814 using the HMI server input/output devices.

The computer-implemented method 900 continues by entering, at 940, an estimated departure time by the operator. Returning to FIG. 8, first pilot 802 and/or second pilot 804 enters the estimated departure time in the trajectory command scheduler server 814 using the HMI server input/output devices.

The computer-implemented method 900 continues by initializing, at 942, the TP with the departure time by the Trajectory Commands Scheduler and determines the time to the next TCW and updates the TP trajectory profile timing information. Returning to FIG. 8, the entry of departure time automatically triggers the TP Trajectory Predictor engine 826, followed by the transfer of the results to the FOM trajectory predictor data 812 and finally updates of the timing information in the trajectory commands scheduler server 814.

The computer-implemented method 900 continues by reviewing, at 944, FOM generated CPDLC commands derived from FOM by the remote pilot and approves commands and selects radio transmit button for uplink initial flight plan (i.e., active flight clearance) to UA vehicle. The computer-implemented method 900 then proceeds to 946. Returning to FIG. 8, first pilot 802 if in command or second pilot 804 if in command selects the transmit button on the HMI server input/output devices.

If the results of the determination at 936 is positive (Yes), then the computer-implemented method 900 proceeds to 946, by starting at brake release, obtaining real-time positions and speeds downlinked from the UA or manned aircraft flight management system (FMS) flight object to, for example, the ADS-B or ADS-C surveillance processor 844. Returning to FIG. 8, first pilot 802 and/or second pilot use the surveillance contract defining the parameters to be downlinks, their downlink rates, etc. using the HMI server input/output devices. Brake release for an air vehicle has started moving and may indicate the start of a taxi or takeoff operations.

The computer-implemented method 900 continues by determining, at 948, a distance to go/time to go, by the scheduler and time values from the current location to the next TCW and all following TCWs in the TP trajectory profile data. Returning to FIG. 8, the FOM trajectory commands scheduler server 814 determines the timing values.

The computer-implemented method 900 continues by determining, at 950, if the time to the next TCW is less than twice a required communication nominal performance (Required Communications Performance—RCP). For example, for FANS 1/A performance standards on current operations, the RCP is 240 seconds round trip maximum latency for CPDLC messages. If the results of the determination at 950 is negative (No), then the computer-implemented method 900 proceeds to 912. If the results of the determination at 950 is positive (Yes), then the computer-implemented method 900 proceeds to 952 and determines the times for all TCWs and times at which to uplink the next trajectory commands to the UA or manned aircraft. The method determines the translation of trajectory commands into CPDLC messages. Returning to FIG. 8, the FOM Trajectory Commands Scheduler announces to the first remote pilot 802 and/or second remote pilot 804 review the displayed times and translated CPDLC messages on the flight object's HMI interfaces.

The computer-implemented method 900 continues by providing, at 954, a corrected trajectory command transmission to time for display to the remote pilot flight object HMI display, and the translated commands into a CPDLC message, for uplinking the time correction trajectory command. Returning to FIG. 8, the FOM Trajectory Commands Scheduler computes the correction times and performs the CPDLC translations for display on the FOM HMI.

The computer-implemented method 900 continues by providing, at 956, the corrected trajectory command for radio transmission to the UA or the manned aircraft including a transmission time correction factor upon a remote pilot approval. The computer-implemented method 900 then continues to 920. Returning to FIG. 8, first pilot 802 if in command or second pilot if in command 804 selects the transmit button on the HMI server input/output devices to command the change in trajectory prior to the upcoming TCW.

The computer-implemented method 900 continues by determining, at 920, if UA vehicle has landed at the destination airport and reached the last TCW. Returning to FIG. 8, first remote pilot 802 if in command or second remote pilot 804 if in command, for example, makes the determination using the FOM HMI. If the results of the determination at 920 is positive (Yes), then the computer-implemented method 900 can end at 922.

If the results of the determination at 920 is negative (No), then the computer-implemented method 900 returns to determining, at 946, if UA vehicle is moving. Returning to FIG. 8, the FOM trajectory prediction data 812 determines the vehicle's next TCW.

Figure 10:
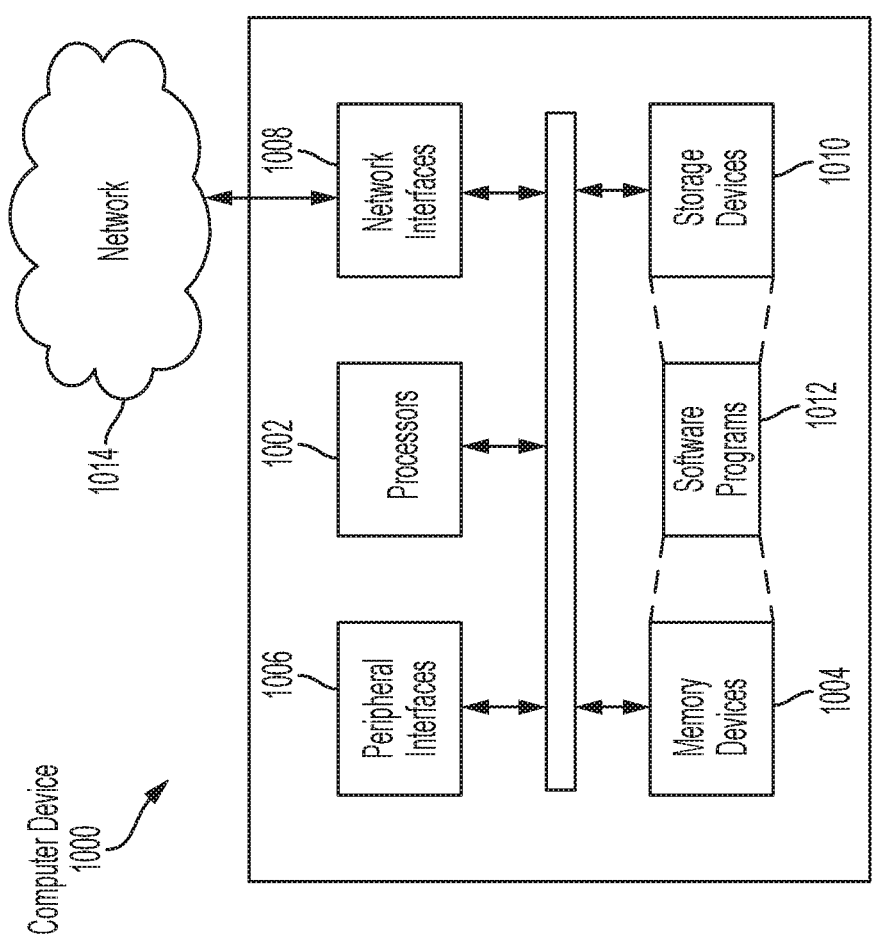
FIG. 10 is an example of a hardware configuration for a computer device, according to examples of the present disclosure.

FIG. 10 is an example of a hardware configuration for computer device 1100, which can be used to perform one or more of the processes described above. Computer device 1000 can be any type of computer devices, such as desktops, laptops, servers, etc., or mobile devices, such as smart telephones, tablet computers, cellular telephones, personal digital assistants, etc. As illustrated in FIG. 10, computer device 1000 can include one or more processors 1002 of varying core configurations and clock frequencies. Computer device 1000 can also include one or more memory devices 1004 that serve as a main memory during the operation of computer device 1000. For example, during operation, a copy of the software that supports the above-described operations can be stored in one or more memory devices 1004. Computer device 1000 can also include one or more peripheral interfaces 1006, such as keyboards, mice, touchpads, computer screens, touchscreens, etc., for enabling human interaction with and manipulation of computer device 1000.

The computer device 1000 can also include one or more network interfaces 1008 for communicating via one or more networks, such as Ethernet adapters, wireless transceivers, or serial network components, for communicating over wired or wireless media using protocols. Computer device 1000 can also include one or more storage devices 1010 of varying physical dimensions and storage capacities, such as flash drives, hard drives, random access memory, etc., for storing data, such as images, files, and program instructions for execution by one or more processors 1002.

Additionally, Computer device 1000 can include one or more software programs 1012 that enable the functionality described above. One or more software programs 1012 can include instructions that cause one or more processors 1002 to perform the processes, functions, and operations described herein, for example, with respect to the processes of FIG. 9. Copies of one or more software programs 1012 can be stored in one or more memory devices 1004 and/or on in one or more storage devices 1010. Likewise, the data utilized by one or more software programs 1012 can be stored in one or more memory devices 1004 and/or on in one or more storage devices 1010.

In implementations, Computer device 1000 can communicate with other devices via network 1014. The other devices can be any types of devices as described above. Network 1014 can be any type of network, such as a local area network, a wide-area network, a virtual private network, the Internet, an intranet, an extranet, a public switched telephone network, an infrared network, a wireless network, and any combination thereof. Network 1014 can support communications using any of a variety of commercially-available protocols, such as TCP/IP, UDP, OSI, FTP, UPnP, NFS, CIFS, AppleTalk, and the like. Network 1014 can be, for example, a local area network, a wide-area network, a virtual private network, the Internet, an intranet, an extranet, a public switched telephone network, an infrared network, a wireless network, and any combination thereof.

Computer device 1000 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of computer device 1000 as described above need not be enclosed within a single enclosure or even located in close proximity to one another. Those skilled in the art will appreciate that the above-described componentry are examples only, as computer device 1000 can include any type of hardware componentry, including any necessary accompanying firmware or software, for performing the disclosed implementations. Computer device 1000 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with examples of the present disclosure disclosed herein can be implemented or performed with a general purpose processor, a digital signal processor (DSP), an application specific integrated circuit (ASIC), a field programmable gate array (FPGA), cryptographic co-processor, or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more examples, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Further, the disclosure comprises embodiments according to the following clauses:

Clause 1: A computer-implemented method (900) for providing air traffic control flight trajectory profile instructions (823) in the form of vehicle trajectory commands (817) to a flight object (821) of a unmanned aircraft or a manned aircraft (818) for air traffic control approved active flight clearance through controlled airspace along a mission (832) of the unmanned aircraft or the manned aircraft, the computer-implemented method (900) comprising:

obtaining (904) aircraft location, requested flight level, aircraft type and intended route constrained by trajectory change waypoints from an operator human-machine interface server (808) of a flight object manager (806);

determining, (908) using the flight object manager, a trajectory profile, from route trajectory change waypoints using longitudinal, latitude, altitude constraints, speed constraints, wind speed, and wind direction input data displayed on the human-machine interface display (801) for one or more remote pilots;

obtaining (926) from the human-machine interface display (801) of a remote pilot in command of the one more remote pilots trajectory profile expected for the mission (832);

determining, (914) through a backward computation performed by a trajectory predictor engine (826) of an entered trajectory profile data (822) starting at a destination up to a current unmanned aircraft or manned aircraft location, a location at an expected trajectory change waypoints;

determining (948) a distance to go and time values from a current location to a next trajectory change waypoint and all following trajectory change waypoints in trajectory profile data;

obtaining (946), continuously after brake release, real-time positions and speeds downlinked from an unmanned aircraft or manned aircraft flight management system (FMS) flight object;

determining (952) a time at which to uplink trajectory commands to the unmanned aircraft or manned aircraft and display times to the HMI of a flight object of the one or more remote pilots;

providing (954) a corrected trajectory command transmission time for display to a flight object human-machine interface of the one or more remote pilots for up linking the corrected trajectory command; and providing (956) the corrected trajectory command for radio transmission to the unmanned aircraft or the manned aircraft, including a transmission time correction factor, upon approval of the remote pilot in command.

Clause 2: The computer-implemented method of clause 1, further comprising determining (916) an intended speed profile of trajectory predictor computations by reading performance data in aircraft performance models, geometric based or performance based methods.

Clause 3: The computer-implemented method of clauses 1 or 2, further comprising storing (918) the unmanned aircraft or manned aircraft trajectory profile expected for the mission in trajectory predictor trajectory profile data (822).

Clause 4: The computer-implemented method of clauses 1-3, further comprising determining (944) a controller-pilot data link communications (CPDLC) commands that executes a trajectory change in the flight object of the unmanned aircraft or the manned aircraft (810).

Clause 5: The computer-implemented method of clauses 1-4, further comprising continuously computing (946) an uplink time correction factor at a next trajectory change waypoint (814).

Clause 6: The computer-implemented method of clauses 1-5, wherein the air traffic control approved active flight clearance comprise an air traffic control approved connected path comprising a starting gate (102) to an ending gate (128) and all times and air traffic control constraints comprising speeds or altitudes at trajectory change waypoints in between during aircraft movement.

Clause 7: The computer-implemented method of clauses 1-6, wherein the vehicle trajectory commands are provided using future air navigation system (FANS) CPDLC (controller-pilot data link communications) messages, or messages over future networks enabled for Internet Protocol Suite messages, or Control and Non-Payload Communications technologies.

Clause 8: A computer system comprising:
a hardware processor;
a non-transitory computer readable medium (1004, 1010) storing instructions that cause the hardware processor (1002) to perform a computer-implemented method (900) for providing air traffic control flight trajectory profile instructions (823) in form of vehicle trajectory commands to a flight object (821) of a unmanned aircraft or a manned aircraft (818) for air traffic control approved active flight clearance through controlled airspace along a mission (832) of the unmanned aircraft or the manned aircraft, the computer-implemented method (900) comprising:

obtaining (904) aircraft location, requested flight level, aircraft type and intended route constrained by trajectory change waypoints from an operator human-machine interface server (808) of a flight object manager (806);

determining, (908) using the flight object manager, a trajectory profile, from route trajectory change waypoints using longitudinal, latitude, altitude constraints, speed constraints, wind speed, and wind direction input data displayed on the human-machine interface display (801) for one or more remote pilots;

obtaining (926) from the human-machine interface display (801) of a remote pilot in command of the one more remote pilots trajectory profile expected for the mission (832);

determining, (914) through a backward computation performed by a trajectory predictor engine (826) of an entered trajectory profile data (822) starting at a destination up to a current unmanned aircraft or manned aircraft location, a location at an expected trajectory change waypoints;

determining (948) a distance to go and time values from a current location to a next trajectory change waypoint and all following trajectory change waypoints in trajectory profile data;

obtaining (946), continuously after brake release, real-time positions and speeds downlinked from an unmanned aircraft or manned aircraft flight management system (FMS) flight object;

determining (952) a time at which to uplink trajectory commands to the unmanned aircraft or manned aircraft and display times to the HMI of a flight object of the one or more remote pilots;

providing (954) a corrected trajectory command transmission time for display to a flight object human-machine interface of the one or more remote pilots for up linking the corrected trajectory command; and providing (956) the corrected trajectory command for radio transmission to the unmanned aircraft or the manned aircraft, including a transmission time correction factor, upon approval of the remote pilot in command.

Clause 9: The computer system of clause 8, wherein the hardware processor is further configured to perform the method comprising determining (916) an intended speed profile of trajectory predictor computations by reading performance data in aircraft performance models, geometric based or performance based methods.

Clause 10: The computer system of clauses 8 or 9, wherein the hardware processor is further configured to perform the method further comprising storing (918) the unmanned aircraft or manned aircraft trajectory profile expected for the mission in trajectory predictor trajectory profile data (822).

Clause 11: The computer system of clauses 8-10, wherein the hardware processor is further configured to perform the method further comprising determining (914) a controller-pilot data link communications (CPDLC) commands that executes a trajectory change in the flight object of the unmanned aircraft or the manned aircraft (810).

Clause 12: The computer system of clause 8-11, wherein the hardware processor is further configured to perform the method further comprising continuously computing (946) an uplink time correction factor at a next trajectory change waypoint (814).

Clause 13: The computer system of clause 8-12, wherein the air traffic control approved active flight clearance comprise an air traffic control approved connected path comprising a starting gate (102) to an ending gate (128) and all times and air traffic control constraints comprising speeds or altitudes at trajectory change waypoints in between during aircraft movement.

Clause 14: The computer system of clauses 8-13, wherein the vehicle trajectory commands are provided using future air navigation system (FANS) CPDLC (controller-pilot data link communications) messages, or messages over future networks enabled for Internet Protocol Suite messages, or Control and Non-Payload Communications technologies.

Clause 15: A non-transitory computer readable medium configured to store instructions that when executed by a hardware process perform a computer-implemented method for providing air traffic control flight trajectory profile instructions (823) in the form of vehicle trajectory commands (817) to a flight object (821) of a unmanned aircraft or a manned aircraft (818) for air traffic control approved active flight clearance through controlled airspace along a mission (832) of the unmanned aircraft or the manned aircraft, the computer-implemented method (900) comprising:
- obtaining (904) aircraft location, requested flight level, aircraft type and intended route constrained by trajectory change waypoints from an operator human-machine interface server (808) of a flight object manager (806);
- determining, (908) using the flight object manager, a trajectory profile, from route trajectory change waypoints using longitudinal, latitude, altitude constraints, speed constraints, wind speed, and wind direction input data displayed on the human-machine interface display (801) for one or more remote pilots;
- obtaining (926) from the human-machine interface display (801) of a remote pilot in command of the one more remote pilots trajectory profile expected for the mission (832);
- determining, (914) through a backward computation performed by a trajectory predictor engine (826) of an entered trajectory profile data (822) starting at a destination up to a current unmanned aircraft or manned aircraft location, a location at an expected trajectory change waypoints;
- determining (948) a distance to go and time values from a current location to a next trajectory change waypoint and all following trajectory change waypoints in trajectory profile data;
- obtaining (946), continuously after brake release, real-time positions and speeds downlinked from an unmanned aircraft or manned aircraft flight management system (FMS) flight object;
- determining (952) a time at which to uplink trajectory commands to the unmanned aircraft or manned aircraft and display times to the HMI of a flight object of the one or more remote pilots;
- providing (954) a corrected trajectory command transmission time for display to a flight object human-machine interface of the one or more remote pilots for up linking the corrected trajectory command; and
- providing (956) the corrected trajectory command for radio transmission to the unmanned aircraft or the manned aircraft, including a transmission time correction factor, upon approval of the remote pilot in command.

Clause 16: The non-transitory computer readable medium of clause 15, further comprising determining (916) an intended speed profile of trajectory predictor computations by reading performance data in aircraft performance models, geometric based or performance based methods.

Clause 17: The non-transitory computer readable medium of clauses 15 or 16, further comprising storing (918) the unmanned aircraft or manned aircraft trajectory profile expected for the mission in trajectory predictor trajectory profile data (822).

Clause 18: The non-transitory computer readable medium of clauses 15-17, further comprising determining (944) a controller-pilot data link communications (CPDLC) command that executes a trajectory change in the flight object of the unmanned aircraft or the manned aircraft (810).

Clause 19: The non-transitory computer readable medium of clauses 15-18, further comprising continuously computing (946) an uplink time correction factor at a next trajectory change waypoint (814).

Clause 20: The non-transitory computer readable medium of clauses 15-19, wherein the air traffic control approved active flight clearance comprise an air traffic control approved connected path comprising a starting gate (102) to an ending gate (128) and all times and air traffic control constraints comprising speeds or altitudes at trajectory change waypoints in between during aircraft movement.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated examples, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the examples, and may also include other parts not describe in the examples. Accordingly, the disclosure is not limited to the above-described examples, but instead is defined by the appended claims in light of their full scope of equivalents.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. $-1, -2, -3, -10, -20, -30$, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A computer-implemented method for providing air traffic control flight trajectory profile instructions in the form of vehicle trajectory commands to a flight object of a unmanned aircraft or a manned aircraft for air traffic control approved active flight clearance through controlled airspace along a mission of the unmanned aircraft or the manned aircraft, the computer-implemented method comprising:
   obtaining aircraft location, requested flight level, aircraft type and intended route constrained by trajectory change waypoints from an operator human-machine interface server of a flight object manager;
   determining, using the flight object manager, a trajectory profile, from route trajectory change waypoints using longitudinal, latitude, altitude constraints, speed constraints, wind speed, and wind direction input data displayed on the human-machine interface display for one or more remote pilots;
   obtaining from the human-machine interface display of a remote pilot in command of the one more remote pilots trajectory profile expected for the mission;
   determining, through a backward computation performed by a trajectory predictor engine of an entered trajectory profile data starting at a destination up to a current unmanned aircraft or manned aircraft location, a location at an expected trajectory change waypoints;
   determining a distance to go and time values from a current location to a next trajectory change waypoint and all following trajectory change waypoints in trajectory profile data;
   obtaining, continuously after brake release, real-time positions and speeds downlinked from an unmanned aircraft or manned aircraft flight management system (FMS) flight object;
   determining a time at which to uplink trajectory commands to the unmanned aircraft or manned aircraft and display times to the human-machine interface of a flight object of the one or more remote pilots;
   providing a corrected trajectory command transmission time for display to a flight object human-machine interface of the one or more remote pilots for up linking the corrected trajectory command; and
   providing the corrected trajectory command for radio transmission to the unmanned aircraft or the manned aircraft, including a transmission time correction factor, upon approval of the remote pilot in command.

2. The computer-implemented method of claim 1, further comprising determining an intended speed profile of trajectory predictor computations by reading performance data in aircraft performance models, geometric based or performance based methods.

3. The computer-implemented method of claim 1, further comprising storing the unmanned aircraft or manned aircraft trajectory profile expected for a mission in trajectory predictor trajectory profile data.

4. The computer-implemented method of claim 1, further comprising determining a controller-pilot data link communications (CPDLC) commands that executes a trajectory change in the flight object of the unmanned aircraft or the manned aircraft.

5. The computer-implemented method of claim 1, further comprising continuously computing an uplink time correction factor at a next trajectory change waypoint.

6. The computer-implemented method of claim 1, wherein the air traffic control approved active flight clearance comprise an air traffic control approved connected path comprising a starting gate to an ending gate and all times and air traffic control constraints comprising speeds or altitudes at trajectory change waypoints in between during aircraft movement.

7. The computer-implemented method of claim 1, wherein the vehicle trajectory commands are provided using future air navigation system (FANS) controller-pilot data link communications (CPDLC) messages, or messages over future networks enabled for Internet Protocol Suite messages, or Control and Non-Payload Communications technologies.

8. A computer system comprising:
a hardware processor;
a non-transitory computer readable medium storing instructions that cause the hardware processor to perform a computer-implemented method for providing air traffic control flight trajectory profile instructions in form of vehicle trajectory commands to a flight object of a unmanned aircraft or a manned aircraft for air traffic control approved active flight clearance through controlled airspace along a mission of the unmanned aircraft or the manned aircraft, the computer-implemented method comprising:
obtaining aircraft location, requested flight level, aircraft type and intended route constrained by trajectory change waypoints from an operator human-machine interface server of a flight object manager;
determining, using the flight object manager, a trajectory profile, from route trajectory change waypoints using longitudinal, latitude, altitude constraints, speed constraints, wind speed, and wind direction input data displayed on the human-machine interface display for one or more remote pilots;
obtaining from the human-machine interface display of a remote pilot in command of the one more remote pilots trajectory profile expected for the mission;
determining, through a backward computation performed by a trajectory predictor engine of an entered trajectory profile data starting at a destination up to a current unmanned aircraft or manned aircraft location, a location at an expected trajectory change waypoints;
determining a distance to go and time values from a current location to a next trajectory change waypoint and all following trajectory change waypoints in trajectory profile data;
obtaining, continuously after brake release, real-time positions and speeds downlinked from an unmanned aircraft or manned aircraft flight management system (FMS) flight object;
determining a time at which to uplink trajectory commands to the unmanned aircraft or manned aircraft and display times to the human-machine interface of a flight object of the one or more remote pilots;
providing a corrected trajectory command transmission time for display to a flight object human-machine interface of the one or more remote pilots for up linking the corrected trajectory command; and providing the corrected trajectory command for radio transmission to the unmanned aircraft or the manned aircraft, including a transmission time correction factor, upon approval of the remote pilot in command.

9. The computer system of claim 8, wherein the hardware processor is further configured to perform the method comprising determining an intended speed profile of trajectory predictor computations by reading performance data in aircraft performance models, geometric based or performance based methods.

10. The computer system of claim 8, wherein the hardware processor is further configured to perform the method further comprising storing the unmanned aircraft or manned aircraft trajectory profile expected for a mission in trajectory predictor trajectory profile data.

11. The computer system of claim 8, wherein the hardware processor is further configured to perform the method further comprising determining a controller-pilot data link communications (CPDLC) commands that executes a trajectory change in the flight object of the unmanned aircraft or the manned aircraft.

12. The computer system of claim 8, wherein the hardware processor is further configured to perform the method further comprising continuously computing an uplink time correction factor at a next trajectory change waypoint.

13. The computer system of claim 8, wherein the air traffic control approved active flight clearance comprise an air traffic control approved connected path comprising a starting gate to an ending gate and all times and air traffic control constraints comprising speeds or altitudes at trajectory change waypoints in between during aircraft movement.

14. The computer system of claim 8, wherein the vehicle trajectory commands are provided using future air navigation system (FANS) controller-pilot data link communications (CPDLC) messages, or messages over future networks enable for Internet Protocol Suite messages, or Control and Non-Payload Communications technologies.

15. A non-transitory computer readable medium configured to store instructions that when executed by a hardware process perform a computer-implemented method for providing air traffic control flight trajectory profile instructions in the form of vehicle trajectory commands to a flight object of a unmanned aircraft or a manned aircraft for air traffic control approved active flight clearance through controlled airspace along a mission of the unmanned aircraft or the manned aircraft, the computer-implemented method comprising:
obtaining aircraft location, requested flight level, aircraft type and intended route constrained by trajectory change waypoints from an operator human-machine interface server of a flight object manager;
determining, using the flight object manager, a trajectory profile, from route trajectory change waypoints using longitudinal, latitude, altitude constraints, speed constraints, wind speed, and wind direction input data displayed on the human-machine interface display for one or more remote pilots;
obtaining from the human-machine interface display of a remote pilot in command of the one more remote pilots trajectory profile expected for the mission;
determining, through a backward computation performed by a trajectory predictor engine of an entered trajectory profile data starting at a destination up to a current unmanned aircraft or manned aircraft location, a location at an expected trajectory change waypoints;

determining a distance to go and time values from a current location to a next trajectory change waypoint and all following trajectory change waypoints in trajectory profile data;

obtaining, continuously after brake release, real-time positions and speeds downlinked from an unmanned aircraft or manned aircraft flight management system (FMS) flight object;

determining a time at which to uplink trajectory commands to the unmanned aircraft or manned aircraft and display times to the human-machine interface of a flight object of the one or more remote pilots;

providing a corrected trajectory command transmission time for display to a flight object human-machine interface of the one or more remote pilots for up linking the corrected trajectory command; and providing the corrected trajectory command for radio transmission to the unmanned aircraft or the manned aircraft, including a transmission time correction factor, upon approval of the remote pilot in command.

16. The non-transitory computer readable medium of claim 15, further comprising determining an intended speed profile of trajectory predictor computations by reading performance data in aircraft performance models, geometric based or performance based methods.

17. The non-transitory computer readable medium of claim 15, further comprising storing the unmanned aircraft or manned aircraft trajectory profile expected for a mission in trajectory predictor trajectory profile data.

18. The non-transitory computer readable medium of claim 15, further comprising determining a controller-pilot data link communications (CPDLC) commands that executes a trajectory change in the flight object of the unmanned aircraft or the manned aircraft.

19. The non-transitory computer readable medium of claim 15, further comprising continuously computing an uplink time correction factor at a next trajectory change waypoint.

20. The non-transitory computer readable medium of claim 15, wherein the air traffic control approved active flight clearance comprise an air traffic control approved connected path comprising a starting gate to an ending gate and all times and air traffic control constraints comprising speeds or altitudes at trajectory change waypoints in between during aircraft movement.

* * * * *